Nov. 16, 1937.  E. EGER  2,099,006

TIRE ANTISKID DEVICE

Filed June 11, 1936

INVENTOR.
ERNST EGER
BY Walter L. Pipes
ATTORNEY.

UNITED STATES PATENT OFFICE 2,099,006

TIRE ANTISKID DEVICE

Ernst Eger, Grosse Pointe Park, Mich., assignor to United States Rubber Products, Inc., New York, N. Y., a corporation of Delaware Application June 11, 1936, Serial No. 84,649

3 Claims. (Cl. 152—14)

This invention relates to antiskid devices for pneumatic tires, and it relates particularly to a detachable unit applicable to a pneumatic tire for the purpose of engaging with a road surface and increasing the antiskid quality of the tire.

In general, the invention comprises a cross-strap of rubber composition reinforced with parallel, longitudinally extending cords with a plurality of individual traction elements formed in the rubber composition, at least some of the traction elements having embedded therein a cup shaped metallic member so positioned that its rim portion is flush with the surface of the traction element and anchoring means. The cup shaped members each preferably has an opening in its base portion whereby some of the rubber composition may extend through the opening and into the cup shaped member.

My antiskid device operates effectively in snow or mud, or on a hard, smooth surface such as ice; and in addition, it is quiet in operation.

The accompanying drawing illustrates a present preferred embodiment of the invention; in which:—

Figure 1:
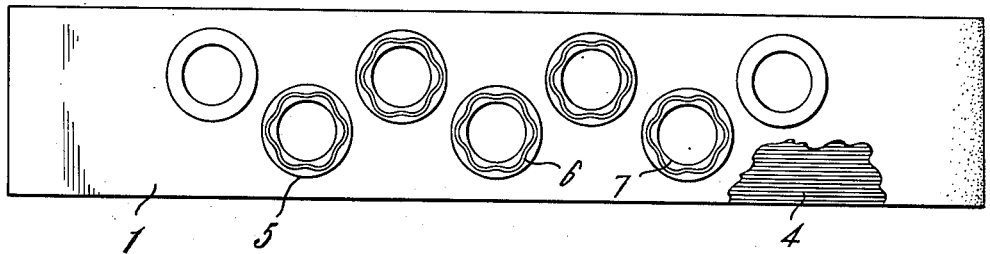
Fig. 1 is a plan view of the cross-strap of my improved antiskid device with a portion of its surface broken away to illustrate the interior.
Figure 2:
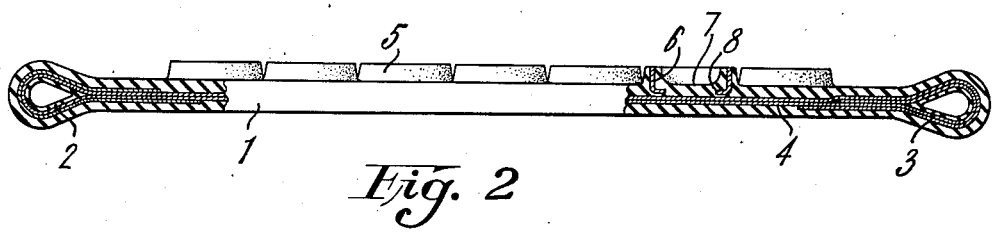
Fig. 2 is a side elevational view thereof, partly in section.

With reference to Figs. 1 and 2 of the drawing, I show an antiskid device in the form of a strap or cross member 1, having eyes 2 and 3 at the ends thereof. The body of the strap 1 is composed of rubber somewhat similar to the tread stock of conventional pneumatic tires.

Embedded within the strap 1 are a plurality of cords 4 extending parallel with the length of the strap 1. The cords 4 are relatively close together, and provide, in effect, a ply of fabric in which all of the cords extend in parallel relation. In order to obtain the desired strength, I prefer to use two plies or two sets of parallel cords embedded within the strap 1. The ends of the cords 4 extend around the eyes 2 and 3, respectively, forming a lapped splice. The cords 4 forming the fabric are rubberized in a manner similar to the cords which form the carcass of conventional pneumatic tires.

Projecting from one side of the strap 1 are a plurality of individual antiskid elements 5. These elements are of a rubber composition similar to that of the body of the strap 1. Within each, or some of the tread elements 5, a metal insert 6 is imbedded. These elements are embedded in such manner that the rim portion of the cup member is flush with the road contacting surface of the antiskid elements.

As indicated in Fig. 1, the cup shaped inserts may be embedded only in certain of the antiskid elements. For example, it is preferable to omit the inserts from the outermost antiskid elements because they are likely to be positioned at the shoulder edge of the tire, at which point it is desirable to omit rigid inserts in the strap.

The cup shaped members 6 may be composed of any rigid material, preferably metal. In order to obtain a proper bonding relation between the insert and the rubber composition forming the traction element, it is preferable to treat the insert prior to its assembly to increase its adhesion with the rubber. This may be accomplished in various ways. For example, if the insert is in the form of a steel stamping, it may be bronze plated and coated with a layer of rubber cement. The rims of the cup shaped members 6 may be shaped irregularly, or undulated. It has been found that such a shape is conducive to efficient operation.

Each tread element has a cavity 7 disposed at substantially the central portion thereof, which forms an opening at the road engaging surface of the traction element. The insert 6 has an opening 8 at the base thereof, through which the rubber composition of the strap member 1 may flow during vulcanization to fill in part the interior of the cup shaped member and form an anchor.

It will be noted that the general formation of each traction element and its embedded, cup shaped member is such that the wearing portion of the traction element is unconfined in relation to the insert. This is an important feature, for, if the rubber is not permitted to move readily when under load and in contact with the road surface, there is a tendency for the rubber alone to support the load and prevent the metal insert from engaging directly with the road surface. On icy and slippery surfaces it is highly desirable for the cup shaped metal insert to engage directly with the supporting road surface. This condition is permissible only when the rubber is free to adjust itself in a manner permitting the insert to be exposed at the surface of the traction element.

Notwithstanding the incorporation of the metallic inserts, the embodiment of my invention is relatively quiet in operation. Initially, those portions of the inserts which are exposed at the road engaging surface of the traction elements wear down quickly until the exposed surfaces of the insert are below the rubber surface of the traction elements. Thereafter, the rate of wear of the inserts is substantially the same as the rate of wear of the rubber traction elements. The inserts contact with the road surface only when the cross member is under direct load. An advantage of this wearing condition is that the metal inserts do not contact with the road surface upon the initial engagement of the traction elements with the road. As a result, there is no impact of the metal inserts with the road, and therefore no objectionable noise is produced.

Figure 3:
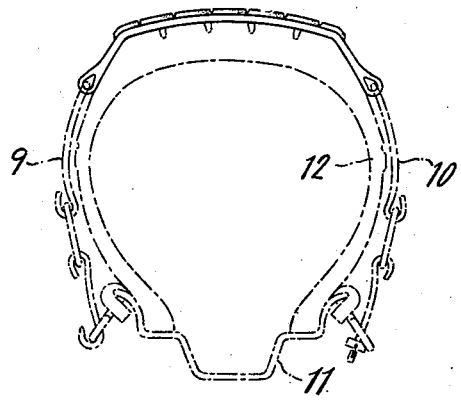
Fig. 3 is a transverse view of a tire and rim assembly, illustrating a method of securing the antiskid device to a tire.

The straps or cross members 1 may be secured to a tire in any conventional manner such as that shown in Fig. 3. Fastening devices such as 9 and 10 may be attached to the cross member 1 through the medium of the eyes 2 and 3, and secured to a rim 11 which supports a tire 12.

While I have shown one type of fastening means in dot-and-dash lines, it is to be understood that a wide variety of fastening devices may be used for cooperation with the eyes 2 and 3.

Figure 4:
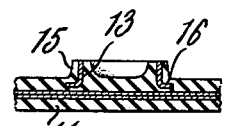
Fig. 4 is a portion of a side elevational view, in section, of a modified form of antiskid insert.

In Fig. 4, I show, by way of modification, a metal insert 13 embedded in a body of rubber forming a cross member 14 and traction element 15. In this modification the metal insert 13 is tubular in form, having the base portion of the tubular wall flared outwardly in the form of a flange 16.

Accordingly, I have provided a cross member for antiskid devices which is flexible in operation, quiet in performance, and efficient as a traction medium.

While I have shown and described certain present preferred embodiments of my invention, it will be understood that modifications may be made therein without departing from the spirit of the invention or the scope of the appended claims.

Having thus described my invention, what I claim and desire to protect by Letters Patent is:—

1. An antiskid unit comprising a cup-shaped metallic member presenting a cutting edge to a road surface, an external rubber composition covering for the member bonded thereto, said covering being externally unconfined near said cutting edge to permit the rubber composition adjacent to said edge to move relatively thereto, and a body of bonded rubber composition disposed internally of and incompletely filling the member and forming a thin internally unconfined covering for the interior of said cutting edge, whereby the rubber composition adjacent to said edge may be distorted sufficiently to permit the edge to have a cutting engagement with a road surface.

2. An antiskid cross member comprising a strap, means for securing the strap, and a plurality of antiskid units mounted on the strap, each unit comprising a cup-shaped metallic member presenting a cutting edge to a road surface, an external rubber composition covering for the strap and member bonded thereto, said covering being externally unconfined near each cutting edge to permit the rubber composition adjacent to said edge to move relatively thereto, and a body of bonded rubber composition disposed internally of and incompletely filling the members and forming a thin internally unconfined covering for the interior of said cutting edges, whereby the rubber composition adjacent to said edges may be distorted sufficiently to permit the edges to have a cutting engagement with a road surface.

3. An antiskid cross member comprising a base of strain resisting elements, means for securing the base, a rubber composition covering for the base, and metallic cup shaped elements each having an exposed cutting edge embedded in and bonded to said covering, the rubber composition covering extending upwardly externally of each member and terminating in thin externally unsupported edges adjacent to said cutting edges, and extending inwardly through openings in the cup-shaped elements, but not completely filling them, and forming thin internally unsupported edges adjacent to said cutting edges, whereby the rubber composition adjacent said cutting edges may be distorted to permit the cutting edges to directly exert a cutting action on a road surface.

ERNST EGER.